United States Patent [19]

Abramczyk et al.

[11] Patent Number: 5,445,409
[45] Date of Patent: Aug. 29, 1995

[54] PASSENGER AIRBAG SNAP-ON DEPLOYMENT DOOR

[75] Inventors: William M. Abramczyk, Rochester Hills, Mich.; Kimberly L. Ikirt, Springboro, Ohio

[73] Assignee: General Motors Corporation, Detroit, Mich.

[21] Appl. No.: 323,991

[22] Filed: Oct. 17, 1994

[51] Int. Cl.⁶ ............................................. B60R 21/16
[52] U.S. Cl. ................................ 280/728.2; 280/728.3
[58] Field of Search ............ 280/728 R, 728 A, 728 B, 280/731, 732

[56] References Cited

U.S. PATENT DOCUMENTS

| 3,791,554 | 2/1974 | Nagatani et al. | 221/289 |
| 4,245,414 | 1/1981 | Shypula | 40/124 |
| 4,941,678 | 7/1990 | Lauritzen et al. | 280/732 |
| 4,989,897 | 2/1991 | Takada | 280/743 |
| 5,167,427 | 12/1992 | Baba | 280/743 |
| 5,201,541 | 4/1993 | Jones et al. | 280/731 |
| 5,280,946 | 1/1994 | Adams et al. | 280/728 A |
| 5,303,951 | 4/1994 | Goestenkors et al. | 280/728 B |
| 5,312,129 | 5/1994 | Ogawa | 280/728 A |

FOREIGN PATENT DOCUMENTS

| 4169356 | 6/1992 | Japan | 280/728 A |
| 4-221248 | 8/1992 | Japan . | |
| 5131886 | 5/1993 | Japan | 280/728 B |
| 2202496 | 9/1988 | United Kingdom . | |
| WO93/08043 | 4/1993 | WIPO . | |

Primary Examiner—Eric D. Culbreth
Assistant Examiner—Paul N. Dickson
Attorney, Agent, or Firm—Jeffrey A. Sedlar

[57] ABSTRACT

An airbag module for a vehicle includes a deployment door which snap-fittingly engages the module's container through mating hooks and slots without the need for accessory fastening devices. The deployment door includes a pair of legs which extend along-side the container and exhibits a plurality of tabs which are biased into engagement with the container to releasibly secure the deployment door on the container.

5 Claims, 3 Drawing Sheets

PASSENGER AIRBAG SNAP-ON DEPLOYMENT DOOR

BACKGROUND OF THE INVENTION

This invention relates to a supplemental inflatable restraint system for an automobile. More specifically, the invention is directed to the securement of a deployment door to an airbag module.

Airbags are well-known supplemental inflatable restraint systems in widespread use for the safety of automobile occupants. Airbag systems have been developed that typically comprise three basic sub-system groups. These groups include impact sensors and associated wiring, diagnostic devices and airbag modules. The third group, the airbag module, is the subject of the present invention.

The airbag module has been developed for assembly in a modular form and is primarily a complete packaged unit ready for installation in the automobile interior and connection to the other airbag sub-systems during assembly of the vehicle. The airbag module typically comprises a container that serves as both a housing and a reaction device, an inflator that includes a gas-generation mechanism and a cushion that is folded, inserted into the container and attached to the container. The airbag module is typically covered with a deployment door or doors on the automotive interior side of the module to provide a complete enclosure for the folded cushion and through which the cushion is deployed. The container is normally made of sheet metal with the cushion carried near the opening and the inflator mounted near the back of the container thereby forcing the cushion to deploy through the deployment door when the inflator releases gas during discharge. The airbag module is typically connected to the automobile structure via the reaction container.

A deployment door typically includes flanges which overlie and abut flanges on the container. Various brackets and fasteners have been used to attach the flanges of the container and those of the deployment door together. It is desirable to reduce the number of fasteners used in the module assembly. It is also desirable to directly and securely fasten the deployment door to the container without the use of assembly tooling. Such a simplified construction will facilitate assembly of the module.

SUMMARY OF THE INVENTION

This invention provides for the integral securement of a deployment door to an airbag module container. Integral securement permits the deployment door and container to be easily assembled together and permits disassembly, when required, without the necessity for brackets, fasteners or non-integral attachment components. The invention provides a snap-on arrangement that uses a single injection molded part as the deployment door and does not require the addition of inserts or weldments to the container.

The container includes a flange that is positioned around the lip of its discharge opening. Extending from the container's flange are hooks which mate with matching slots in the deployment door's flange to retain the deployment door on the container. The container's flange has an added advantage of providing rigidity to the structure of the container.

An additional feature of the invention is that the deployment door includes a plurality of tabs that mate with openings of the container to secure the deployment door on the container and assist in preventing inadvertent disassembly of the deployment door from the container. When the deployment door is mated with the container the tabs are disposed within the openings and, in concert with the container wall, prevent movement of the deployment door in what would be a disassembly direction. Flexibility of the molded deployment door allows disengagement of the tabs from the container so that the cover is removed by deflection of a terminal edge of the attachment structure of the deployment door. Resiliency of the deployment door facilitates application, removal and re-application of the deployment door to the assembled module.

DETAILED DESCRIPTION OF THE PRESENTLY PREFERRED EMBODIMENT

Figure 1:
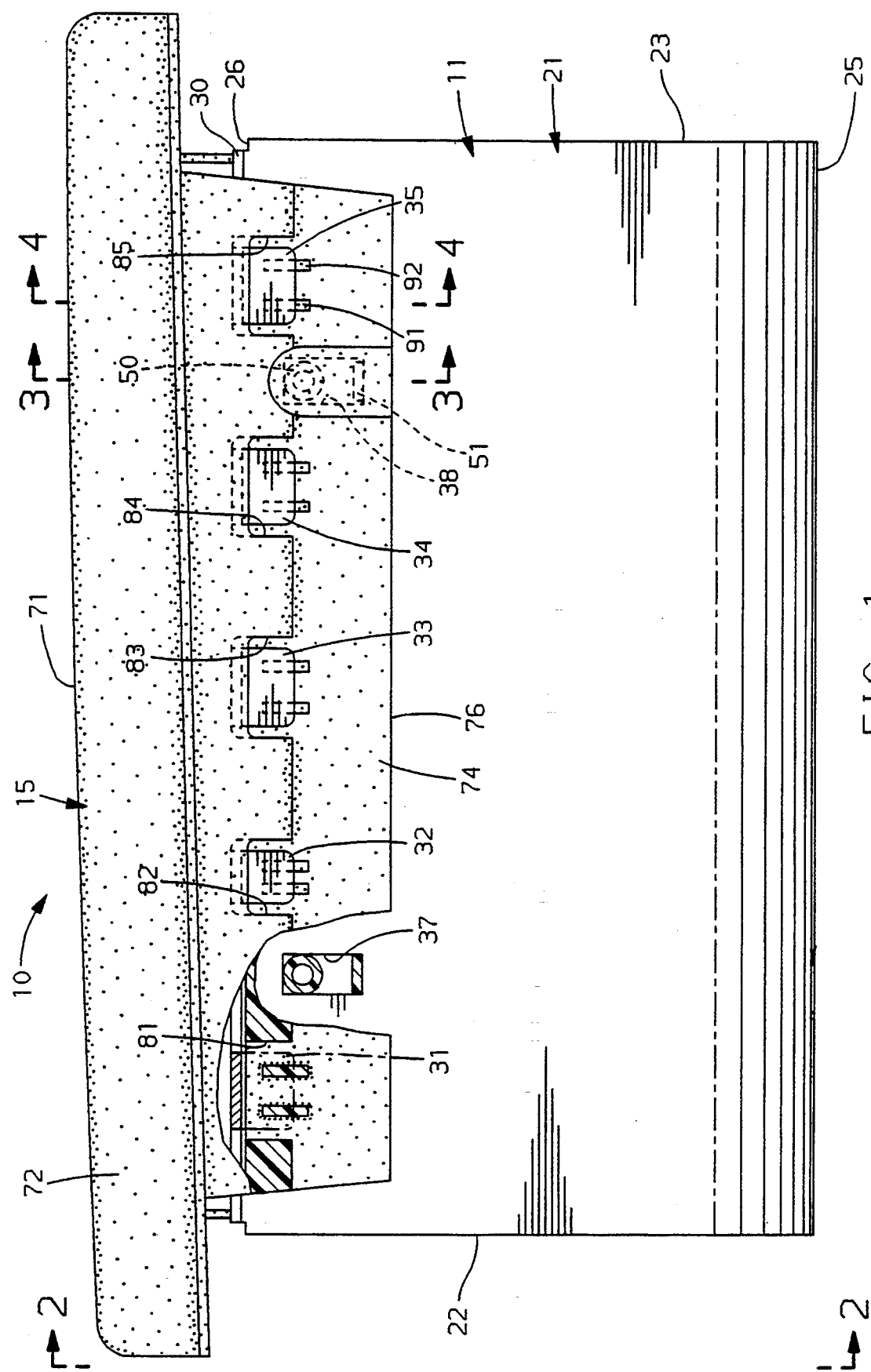
FIG. 1 is a side view of an airbag module assembly according to the present invention.
Figure 2:
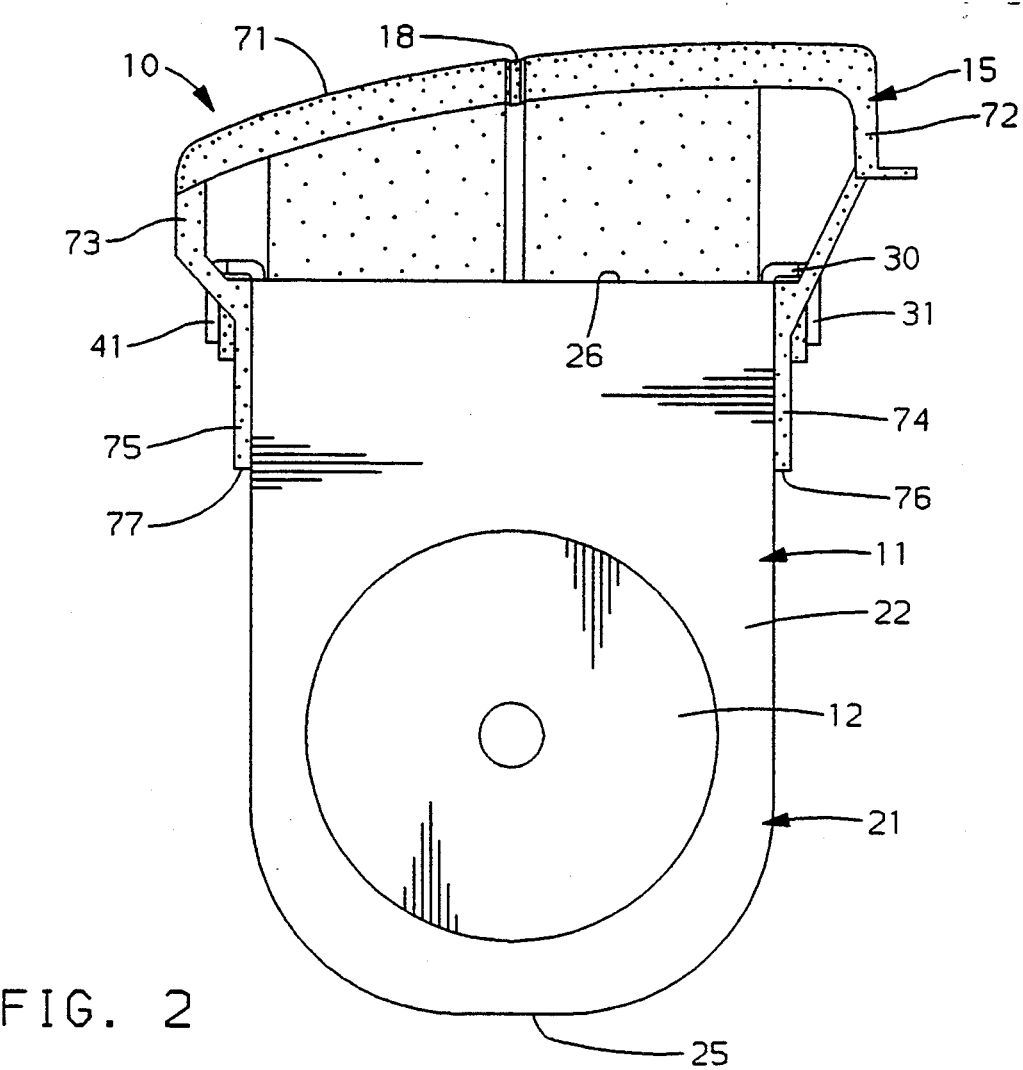
FIG. 2 is an end view of the airbag module assembly as indicated by the line 2—2 in FIG. 1.

Referring to the drawings, FIGS. 1 and 2 illustrate views of an airbag module assembly according to the present invention. The basic component parts of the airbag module, designated generally as 10, include a container 11, a deployment door 15 and an inflator 12. Additionally, a folded airbag cushion 14 (illustrated in FIGS. 3 and 4), is carried within the housing formed by the container 11 which is substantially closed by the deployment door 15. The cushion 14 substantially fills the entire housing and tends to apply an outward bias on the deployment door 15.

Container 11 is comprised generally of body 21 which is made from sheet metal and formed generally into a U-shaped structure with end walls 22 and 23. Container 11 generally forms a rectangular, polyhedron-shaped structure although side 25 is curved and opposed side 26 remains open.

Disposed along opposed sides of container 11 and extending from the opening flange 30 are hooks 31 and 41 as illustrated in FIG. 2. FIG. 1 illustrates that a plurality of hooks are disposed along each side of the container 11. On the side illustrated in FIG. 1 hooks 31–35 are shown. Similarly, the opposite side of container 11 includes a corresponding number of hooks.

Figure 3:
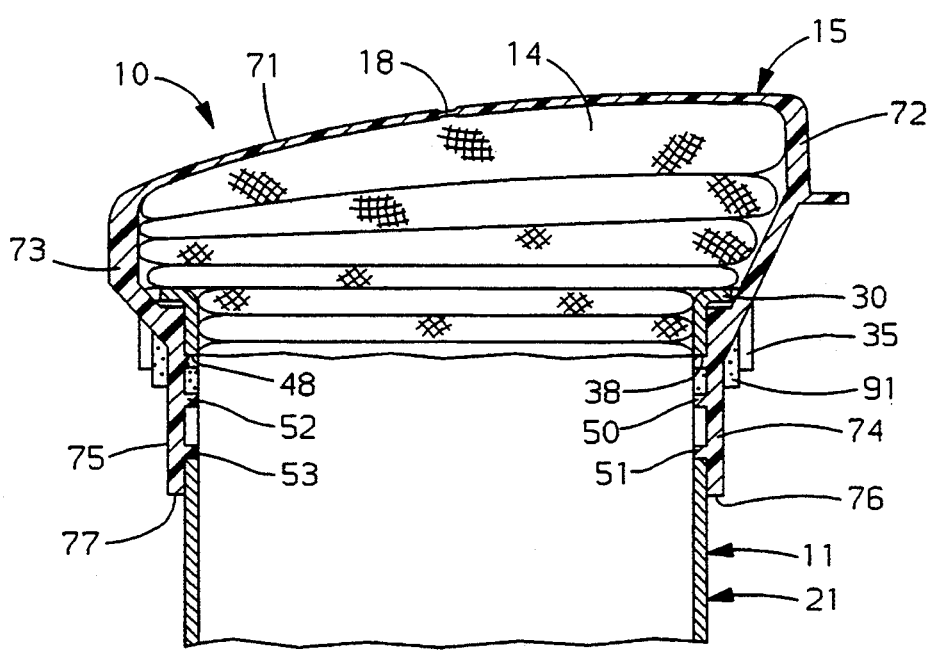
FIG. 3 is a fragmentary cross-sectional view taken generally through the plane indicated by the line 3—3 in FIG. 1.

Disposed proximate to the area of container 11 between hooks 31 and 32 and also between hooks 34 and 35 are tab openings 37 and 38. FIG. 3 illustrates tab openings 38 and 48 which indicates that a pair of tab openings are disposed along each side of container 11.

Deployment door 15 comprises a one-piece injection molded part and is made from a substantially flexible material as is generally in present use in the art. Deployment door 15 includes tear-line 18 which is a weakened linear portion where the deployment door is designed to tear, providing an opening during airbag deployment.

Deployment door 15 includes a substantially flat front face 71 which has contoured edges that extend into sides 72 and 73. Extending from the opposed sides 72 and 73 of deployment door 15 are legs 74 and 75 which form flanges and are adapted to snap-fittingly engage respective opposite sides of container 11.

As illustrated in FIG. 2, deployment door 15 engages hooks 31 and 41 of container 11. FIG. 1 illustrates the engagement mechanism established between deployment door 15 and container 11 through the plurality of mating hooks 31–35 and slots 81–85. Notable is the fact that hook 32 and slot 82 are somewhat narrower than the others. This feature inhibits incorrect assembly of deployment door 15 onto container 11 in a 180 degree mis-oriented position.

FIG. 3 illustrates in cross section the engagement of deployment door 15 with container 11. Leg 74 includes a pair of non-contiguous annular and linear tabs represented by annular tab 50 and linear tab 51 which are illustrated in a perspective view in FIG. 6. Similarly, the inner surface of leg 75 includes a pair of annular and linear tabs represented by annular tab 52 and linear tab 53. When properly assembled, tabs 50 and 51 are positioned within tab opening 38 of container 11. Similarly, tabs 52 and 53 are positioned in tab opening 48.

Figure 4:
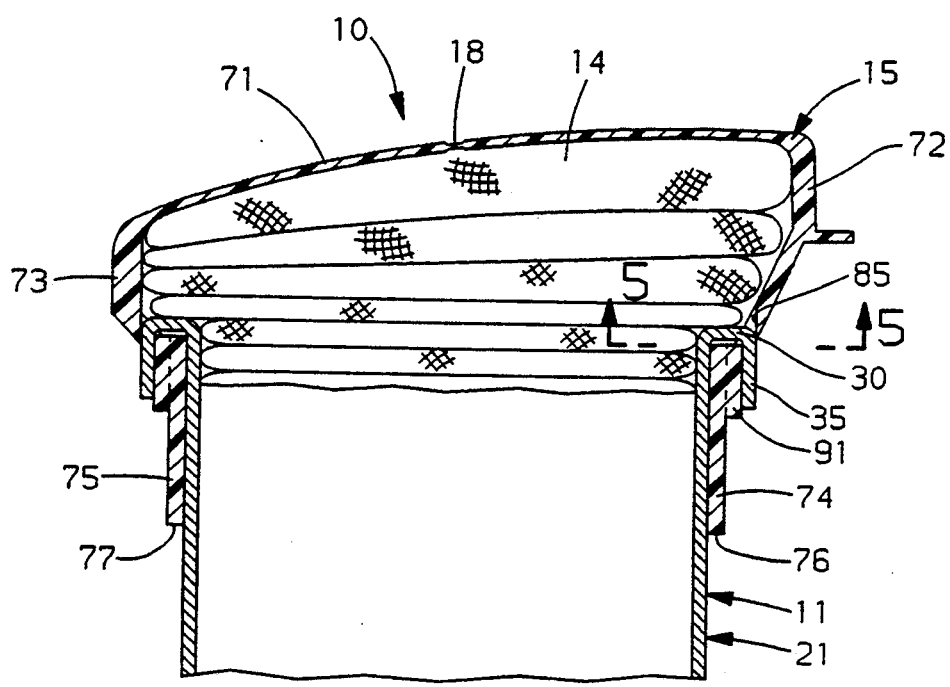
FIG. 4 is a fragmentary cross-sectional view taken generally through the plane indicated by the line 4—4 in FIG. 1.
Figure 5:
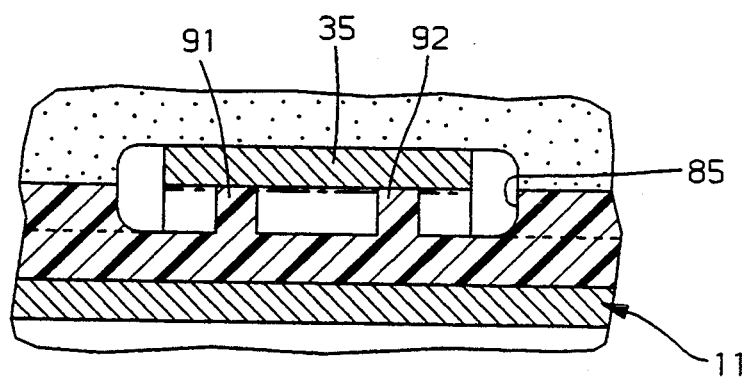
FIG. 5 is a fragmentary view of an airbag module assembly as indicated by the line 5—5 in FIG. 4.

Leg 74 is biased inwardly against the exterior wall of container 11 through the features illustrated in FIGS. 4 and 5 comprising ribs 91 and 92. When any of hooks 31–35 extend through their mating slot in deployment door 15, the associated ribs on deployment door 15 represented by ribs 91 and 92 bias leg 74 inwardly. The combination of ribs 91 and 92 along with annular tab 50 and linear tab 51 provide a releasable locking feature to the snap assembly of leg 74 of deployment door 15 onto container 11. Similarly, the outer surface of leg 75 includes a pair of ribs in each of its plurality of slots which operate to bias leg 75 inwardly.

During module assembly, as the hooks are positioned into their mated slots in deployment door 15, each pair of ribs operates to bias the legs 74 or 75 inwardly and to aid in the engagement of the tabs with the tab openings in container 11. Once the deployment door 15 and container 11 are properly assembled, inadvertent disassembly is inhibited by the engagement of the tabs within the tab openings. Intentional disassembly remains readily possible by bending the terminal edge 76 of leg 74 or the terminal edge 77 of leg 75 outwardly away from the wall of container 11 to disengage either tabs 50 and 51 or tabs 52 and 53 from their respective tab opening. This permits the sliding disengagement of the slots in deployment door 15 from the hooks of container 11 and allows removal of deployment door 15 from airbag module 10.

Figures 6, 7:
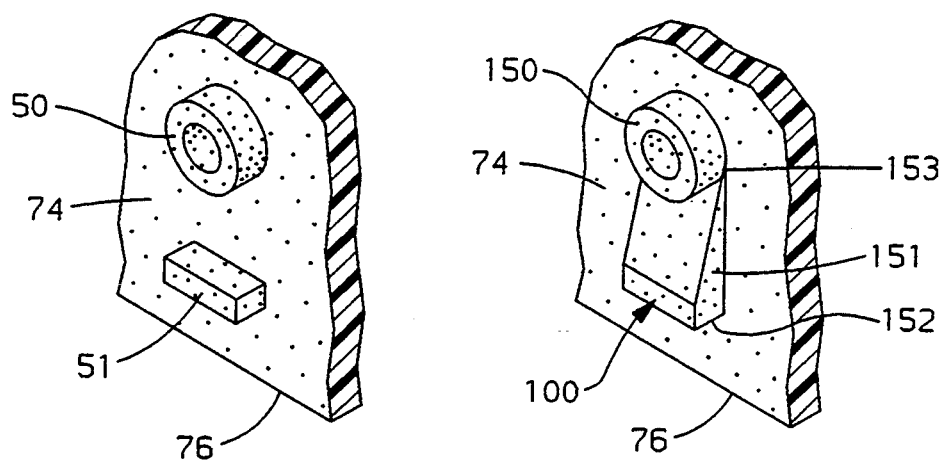
FIG. 6 is a fragmentary perspective view of a deployment door illustrating an annular and linear tab.
FIG. 7 is a fragmentary perspective view of a deployment door illustrating an alternative embodiment of a tab.

Illustrated in FIG. 7 is a perspective view of an alternative embodiment of a tab 100. The integrated tab 100 operates in place of the combination annular tab 50 and linear tab 51. Tab 100 is comprised of annular portion 150 which projects from the inner surface of the deployment door's leg 74. Tab 100 also includes ramped portion 151 which extends from end 153 at annular portion 150 to end 152 where it terminates. Ramped portion 151 provides increased rigidity to end 152. End 152 provides a surface for engaging a container within its tab opening to provide a releasable locking feature to secure a deployment door on a container.

What is claimed is:

1. An airbag module comprising:
   a deployment door including a pair of extending opposed legs each leg having a number of slots and including an inner surface, each inner surface including a tab; and
   a container having a tab opening and including a number of hooks formed as one piece with the container corresponding to the number of slots in the deployment door, wherein each hook is positionable through one of the slots in the deployment door providing engagement between the deployment door and the container and wherein the hooks bias the tab into the tab opening in the container to removably secure the deployment door onto the container.

2. An airbag module comprising:
   a deployment door including a pair of extending opposed legs each leg having a number of slots and including an inner surface and an outer surface, each inner surface including a plurality of tabs and each outer surface including a plurality of ribs; and
   a container having a plurality of tab openings and including a number of hooks corresponding to the number of slots in the deployment door, wherein each hook is positionable through a slot in the deployment door providing engagement between the deployment door and the container and wherein the ribs operate in conjunction with the hooks to bias the tabs into the tab openings in the container to removably secure the deployment door onto the container.

3. An airbag module according to claim 2 wherein each tab includes an annular portion and a non-contiguous linear portion.

4. An airbag module according to claim 2 wherein each tab includes an annular portion and a contiguous ramped portion.

5. An airbag module comprising:
   a deployment door including a pair of extending opposed legs each leg having a number of slots and including an inner surface and an outer surface, each inner surface including an annular tab and a linear tab and each outer surface including a plurality of ribs;
   a container having a tab opening and including a number of hooks corresponding to the number of slots in the deployment door wherein each hook is positionable through a slot in the deployment door providing a snap-fitting engagement between the deployment door and the container and wherein the ribs operate in conjunction with the hooks to bias the annular tab and the linear tab into the tab opening in the container to removably secure the deployment door onto the container; and
   a cushion carried within the container and applying an outward bias on the deployment door.

* * * * *